United States Patent
Tong et al.

(10) Patent No.: US 10,929,719 B2
(45) Date of Patent: Feb. 23, 2021

(54) ADVERSARIAL ATTACK ON BLACK BOX OBJECT DETECTION ALGORITHM

(71) Applicant: GM Global Technology Operations LLC, Detroit, MI (US)

(72) Inventors: Wei Tong, Troy, MI (US); Shuqing Zeng, Sterling Heights, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 53 days.

(21) Appl. No.: 16/367,590

(22) Filed: Mar. 28, 2019

(65) Prior Publication Data
US 2020/0311481 A1 Oct. 1, 2020

(51) Int. Cl.
*G06K 9/00* (2006.01)
*G06K 9/62* (2006.01)

(52) U.S. Cl.
CPC ....... *G06K 9/6262* (2013.01); *G06K 9/00805* (2013.01); *G06K 9/6256* (2013.01)

(58) Field of Classification Search
CPC . G06K 9/6262; G06K 9/00805; G06K 9/6256
See application file for complete search history.

(56) References Cited

U.S. PATENT DOCUMENTS

| 10,783,401 B1 * | 9/2020 | Jiang | G06K 9/00765 |
| 2019/0238568 A1 * | 8/2019 | Goswami | G06N 20/10 |
| 2020/0028686 A1 * | 1/2020 | Karabina | H04L 9/3231 |
| 2020/0151505 A1 * | 5/2020 | Saito | G06K 9/6256 |

* cited by examiner

*Primary Examiner* — Khai M Nguyen
(74) *Attorney, Agent, or Firm* — Cantor Colburn LLP

(57) ABSTRACT

Systems and methods to generate an adversarial attack on a black box object detection algorithm of a sensor involve obtaining an initial training data set from the black box object detection algorithm. The black box object detection algorithm performs object detection on initial input data to provide black box object detection algorithm output that provides the initial training data set. A substitute model is trained with the initial training data set such that output from the substitute model replicates the black box object detection algorithm output that makes up the initial training data set. Details of operation of the black box object detection algorithm are unknown and details of operation of the substitute model are known. The substitute model is used to perform the adversarial attack. The adversarial attack refers to identifying adversarial input data for which the black box object detection algorithm will fail to perform accurate detection.

20 Claims, 3 Drawing Sheets

ADVERSARIAL ATTACK ON BLACK BOX OBJECT DETECTION ALGORITHM

INTRODUCTION

The subject disclosure relates to an adversarial attack on a black box object detection algorithm.

An object detection algorithm is used with a sensor (e.g., radio detection and ranging (radar) system, camera, light detection and ranging (lidar) system). The object detection algorithm refers to the particular processing of data obtained by the sensor in order to detect one or more objects in the sensor field of view. In a radar system, the object detection algorithm may involve performing one or more Fourier transforms followed by a beam forming process to identify and locate objects. In a camera-based system, the object detection algorithm may include identifying a set of pixel values that are above a threshold value. Adversarial attack refers to a process of determining the operational limits of a detection algorithm. Essentially, data is generated for which the object detection algorithm fails. When the functional details of the object detection algorithm are known, adversarial attack of the object detection algorithm is made easier according to known processes. However, the object detection algorithm may not be known and may be treated as a black box. Accordingly, it is desirable to provide an adversarial attack on a black box object detection algorithm.

SUMMARY

In one exemplary embodiment, a method of generating an adversarial attack on a black box object detection algorithm of a sensor includes obtaining an initial training data set from the black box object detection algorithm. The black box object detection algorithm performs object detection on initial input data to provide black box object detection algorithm output that provides the initial training data set. The method also includes training a substitute model with the initial training data set such that output from the substitute model replicates the black box object detection algorithm output that makes up the initial training data set. Details of operation of the black box object detection algorithm are unknown and details of operation of the substitute model are known. The substitute model is used to perform the adversarial attack, wherein the adversarial attack refers to identifying adversarial input data for which the black box object detection algorithm will fail to perform accurate detection.

In addition to one or more of the features described herein, the method also includes collecting the initial input data from the sensor.

In addition to one or more of the features described herein, the collecting the initial input data includes collecting an image from a camera.

In addition to one or more of the features described herein, the method also includes obtaining the black box object detection algorithm output as a bounding box around a detected object in the image, and processing the black box object detection algorithm output to obtain the initial training data set.

In addition to one or more of the features described herein, the processing includes overlaying a grid on the image with the bounding box around the detected object and assigning a value to each element of the grid based on a presence or a percentage of the bounding box in the element of the grid.

In addition to one or more of the features described herein, the method also includes selecting an architecture for the substitute model.

In addition to one or more of the features described herein, the method also includes modifying the initial input data to obtain second input data.

In addition to one or more of the features described herein, the method also includes obtaining a second training data set based on the black box object detection algorithm performing the object detection on the second input data.

In addition to one or more of the features described herein, the training the substitute model includes ensuring that the output of the substitute model replicates the second training data set based on using the second input data.

In addition to one or more of the features described herein, the method also includes repeating processes of modifying the initial input data to obtain new input data, obtaining new training data based on the black box object detection algorithm performing the object detection on the new input data, and training the substitute model using the new training data.

In another exemplary embodiment, a system to generate an adversarial attack on a black box object detection algorithm includes a sensor to provide initial input data, and a processor to obtain an initial training data set from the black box object detection algorithm. The black box object detection algorithm performs object detection on initial input data to provide black box object detection algorithm output that makes up the initial training data set. The processor trains a substitute model with the initial training data set such that output from the substitute model replicates the black box object detection algorithm output that provides the initial training data set. Details of operation of the black box object detection algorithm are unknown and details of operation of the substitute model are known. The processor uses the substitute model to perform the adversarial attack. The adversarial attack refers to identifying adversarial input data for which the black box object detection algorithm will fail to perform accurate detection.

In addition to one or more of the features described herein, the sensor is a camera.

In addition to one or more of the features described herein, the initial input data includes an image from the camera.

In addition to one or more of the features described herein, the black box object detection algorithm output includes a bounding box around a detected object in the image, and the processor processes the black box object detection algorithm output to obtain the initial training data set.

In addition to one or more of the features described herein, the processor is further configured to process the black box object detection algorithm output by overlaying a grid on the image with the bounding box around the detected object and assigning a value to each element of the grid based on a presence or a percentage of the bounding box in the element of the grid.

In addition to one or more of the features described herein, the processor is further configured to modify the initial input data to obtain second input data.

In addition to one or more of the features described herein, the processor is further configured to obtain a second training data set based on the black box object detection algorithm performing the object detection on the second input data.

In addition to one or more of the features described herein, the processor is further configured to train the substitute model to ensure that the output of the substitute model replicates the second training data set based on using the second input data.

In addition to one or more of the features described herein, the processor is further configured to repeat modifying the initial input data to obtain new input data, obtaining new training data based on the black box object detection algorithm performing the object detection on the new input data, and training the substitute model using the new training data.

In addition to one or more of the features described herein, the sensor is in a vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
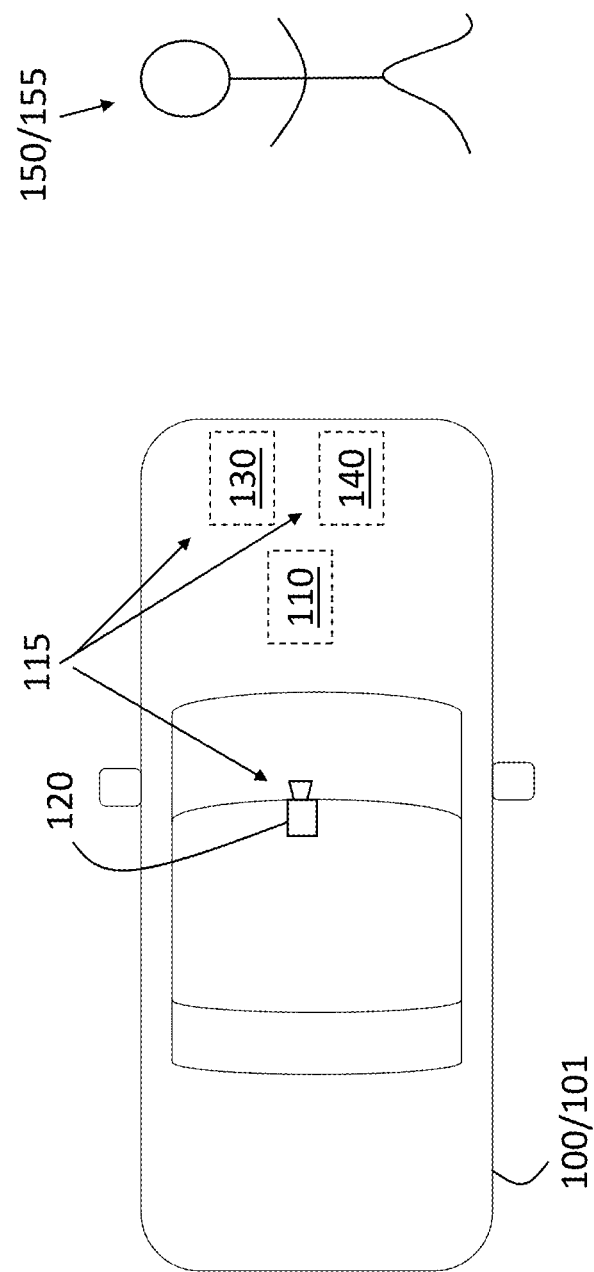
FIG. 1 is a block diagram of a vehicle with sensors that are subjected to adversarial attack on a black box object detection algorithm according to one or more embodiments.

The following description is merely exemplary in nature and is not intended to limit the present disclosure, its application or uses. It should be understood that throughout the drawings, corresponding reference numerals indicate like or corresponding parts and features.

As previously noted, an object detection algorithm is used in conjunction with data obtained with a sensor (e.g., camera, radar system) to obtain information about one or more objects in the field of view of the sensor. An object detection algorithm predicts the class or type of an object as well as its location and size. However, existing adversarial attacking methods facilitate characterization of the classification but not the detection aspect. An adversarial attack may be taken to determine the range of data obtained by the sensor for which the object detection algorithm operates correctly (i.e., accurately detects the object). Specifically, the data obtained by the sensor, with an object in its field of view, may be modified until the object detection algorithm no longer detects the object. As also noted previously, knowing the details of the object detection algorithm makes a successful adversarial attack is relatively straight-forward. However, the operational details of the object detection algorithm may not be known. In that case, the object detection algorithm must be treated as a black box, meaning that only the outputs given a known set of inputs may be determined.

Embodiments of the systems and methods detailed herein relate to an adversarial attack on a black box object detection algorithm. Based on knowing only the outputs that result from the object detection algorithm for a set of known inputs, a substitute model is developed for the object detection algorithm. Because the details of the substitute model are known, the substitute model may be used to develop the adversarial attack that may then be implemented on the object detection algorithm. One or more embodiments may relate to a sensor that is part of a vehicle (e.g., automobile, truck, construction equipment, farm equipment, automated factory equipment). The substitute model developed according to one or more embodiments detailed herein may be used to design an adversarial attack on the object detection algorithm used with the sensor of the vehicle.

In accordance with an exemplary embodiment, FIG. 1 is a block diagram of a vehicle 100 with sensors 115 that are subjected to adversarial attack on a black box object detection algorithm. The vehicle 100 shown in FIG. 1 is an automobile 101. The vehicle 100 includes one or more sensors 115 to detect objects 150 such as the pedestrian 155 shown in FIG. 1. The exemplary vehicle 100 of FIG. 1 includes a camera 120, radar system 130, and lidar system 140. The data obtained by each of these sensors 115 is processed with a detection algorithm. The detection algorithm may be implemented within a sensor 115 or by a controller 110. The exemplary sensors 115 and the exemplary placement of the sensors 115 and controller 110 shown in FIG. 1 may be modified according to alternate embodiments.

For one or more of the sensors 115, an adversarial attack may be undertaken on the object detection algorithm by processing circuitry within the sensor 115 or the controller 110. Because the adversarial attack and characterization of the object detection algorithm of a sensor 115 may be done offline, processing circuitry of another controller 110, not necessarily within the vehicle 100, may be used, as well. As previously noted, the operational details of the object detection algorithm need not be known in order to perform the adversarial attack according to one or more embodiments. For explanatory purposes, the camera 120 is discussed as an exemplary sensor 115 whose object detection undergoes adversarial attack by the controller 110. The controller 110 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
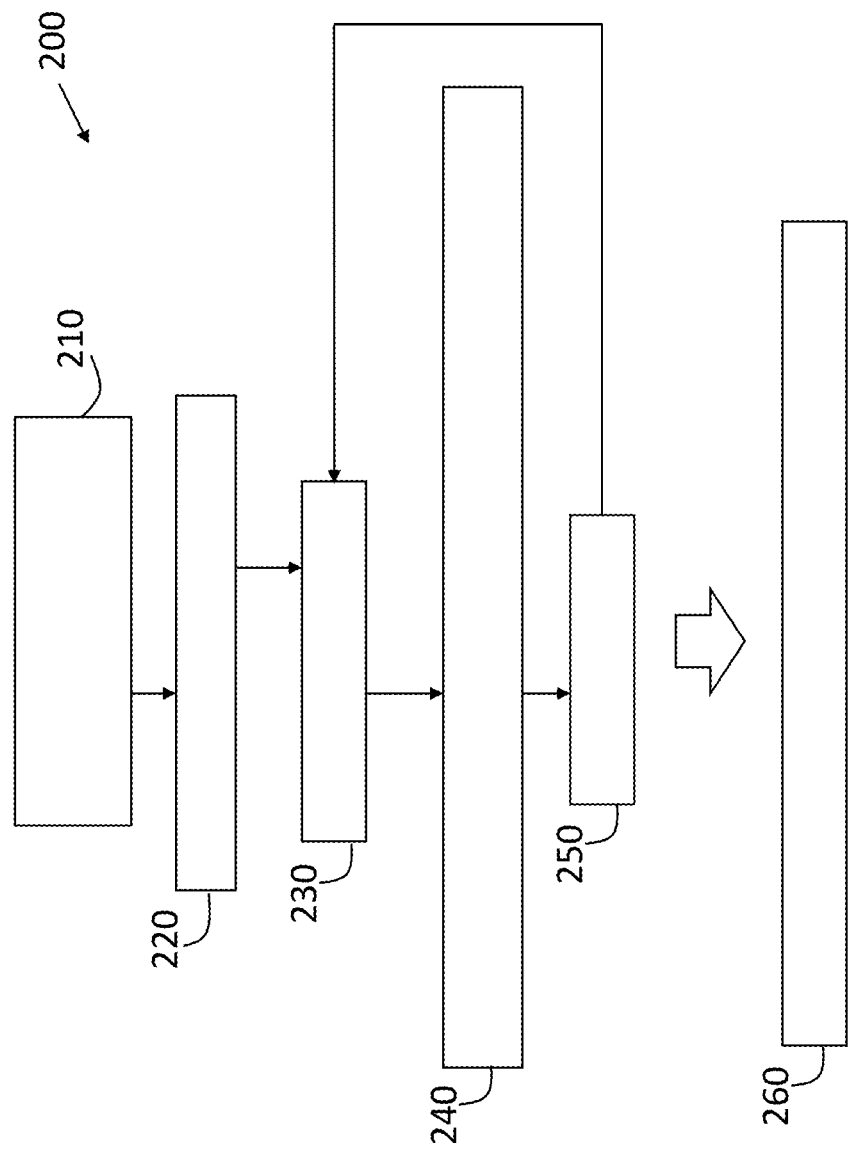
FIG. 2 is a process flow of a method of generating an adversarial attack on a black box object detection algorithm for a sensor according to one or more embodiments.

FIG. 2 is a process flow of a method 200 of generating an adversarial attack on a black box object detection algorithm for a sensor 115 according to one or more embodiments. As shown in FIG. 1, the sensor 115 that uses the object detection algorithm that is characterized based on the adversarial attack may be in a vehicle 100. At block 210, the processes include selecting an architecture for a substitute model. Any known architecture may be selected. For example, a convolutional encoder-decoder architecture may be selected when the sensor 115 is camera 120 and the object detection algorithm is an image detection algorithm. The convolutional encoder-decoder, which is a neural network architecture, includes encoder-decoder pairs that create feature maps and a pixel-wise classification layer. Each pixel in the image is classified, and the classifications include objects of interest.

Collecting data from the sensor 115, at block 220, and obtaining a training set, at block 230, refers to collecting the data that acts as an input to the object detection algorithm and obtaining results from the object detection algorithm. The data is used to obtain the initial training set for the substitute model. In the exemplary case of the sensor 115 being a camera 120, the data are images S that are processed by the object detection algorithm in order to identify any objects of interest in the image. In the exemplary case of the substitute model being a convolutional encoder-decoder, the training set D based on the images S may be represented as:

$$D=\{(\vec{x}, \vec{O}(\vec{x})): \vec{x} \in S\} \quad [\text{EQ. 1}]$$

In EQ. 1, $\vec{x}$ is each image (i.e., pixel matrix) that makes up the images S, and O indicates the actual object detection algorithm, the one that is treated as a black box. Thus, $\vec{O}(\vec{x})$ represents the detection result obtained for the image $\vec{x}$ using the (black box) object detection algorithm. This is the result that the substitute model must also provide in order to act as a substitute for the actual object detection algorithm and is further discussed with reference to FIG. 3.

At block 240, the processes include training the substitute model based on the data (initially, at block 220) and training set (at block 230). In the exemplary case of the substitute model being a convolutional encoder-decoder, the parameters $\theta_F$ of the neural network must be determined in the training process. During the training, the parameters $\theta_F$ of the convolutional encoder-decoder that is used by the substitute model in the exemplary case are adjusted to make the result of the substitute model match that of the actual (black box) object detection algorithm as close as possible.

At block 250, modifying the data refers to modifying the initial data (collected at block 220). In the exemplary case of the data being images S, a Jacobian-based dataset augmentation may be performed as:

$$S \leftarrow \{\vec{x}+\lambda \cdot \text{sgn}(J_F[\vec{O}(\vec{x})]): \vec{x} \in S\} \cup S \quad [\text{EQ. 2}]$$

In EQ. 2, $J_F[\vec{O}(\vec{x})]$ is the Jacobian matrix (i.e., a matrix of first-order partial derivatives of the detection results) and $\lambda$ is a hyperparameter (i.e., a predefined value) which controls how much the original input $\vec{x}$ will be modified by the Jacobian. The modified data is then combined with the existing images S to obtain another training set at block 230. This new training set, is used to further train the substitute model, at block 240. This iterative training (modifying the data at block 250, obtaining a training set for the modified data at block 230, and training the substitute model at block 240) may continue until a predefined maximum number of training epochs is reached. An epoch refers to one cycle of using all the available examples in the training set to update the parameters $\theta_F$.

Once the substitute model is trained (i.e., the parameters $\theta_F$ are obtained in the exemplary case), performing an adversarial attack on the substitute model, at block 260, facilitates characterizing the actual (black box) object detection algorithm without knowing the details of that algorithm. In the exemplary case, with the substitute model represented by F, an adversarial data sample $\vec{x}^*$ may be determined as:

$$\vec{x}^* = \vec{x} + \delta_{\vec{x}} \quad [\text{EQ. 3}]$$

In EQ. 3, $\delta_{\vec{x}}$ is given by:

$$\delta_{\vec{x}} = \in \text{sgn}(\nabla_{\vec{x}} C(F, \vec{x}, y)) \quad [\text{EQ. 4}]$$

In EQ. 4, C is the cost function.

Figure 3:
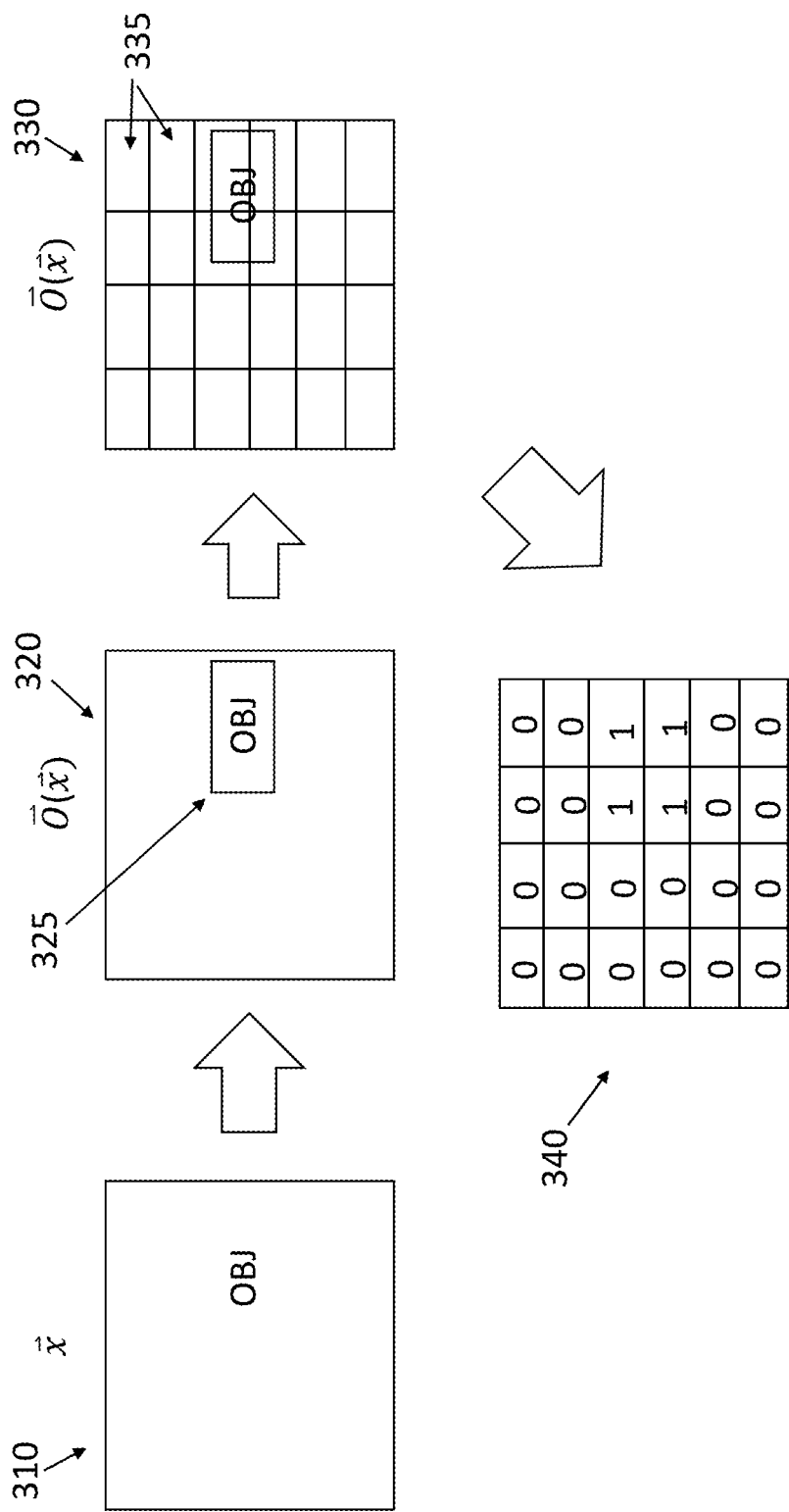
FIG. 3 illustrates the exemplary generation of a training data set as part of generating an adversarial attack on a black box object detection algorithm according to one or more embodiments.

FIG. 3 illustrates the exemplary generation of a training data set D (block 230, FIG. 2) as part of generating an adversarial attack on a black box object detection algorithm according to one or more embodiments. In the example, the sensor 115 is a camera 120. An image $\vec{x}$ 310 among the images S includes an object, indicated as OBJ. By providing the image $\vec{x}$ as an input to the actual (black box) object detection algorithm, an output $\vec{O}(\vec{x})$ 320 is obtained. Based on the object detection algorithm, the object OBJ in the output image has a bounding box 325 around it. A grid is overlaid on this output image 320 to obtain a grid overlay image 330 with the output image divided into a number of grids 335, which can also be referred to as elements or boxes of the grid. Training data 340 is generated by placing a "1" in any grid 335 in which the bounding box 325 appears and a "0" in every other grid 335. Alternately, a threshold overlap of the bounding box 325 within a grid 335 may be required for the grid 335 to receive a "1" instead of "0" or a real number between 0 and 1 may be issued to each grid 335 based on the percentage of overlap of the bounding box 325 in the grid 335. As previously noted, the training data 340 acts as ground truth during the training of the substitute model (at block 240).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of generating an adversarial attack on a black box object detection algorithm of a sensor, the method comprising:
    obtaining an initial training data set from the black box object detection algorithm, wherein the black box object detection algorithm performs object detection on initial input data to provide black box object detection algorithm output that provides the initial training data set;
    training a substitute model with the initial training data set such that output from the substitute model replicates the black box object detection algorithm output that makes up the initial training data set, wherein details of operation of the black box object detection algorithm are unknown and details of operation of the substitute model are known; and
    using the substitute model to perform the adversarial attack, wherein the adversarial attack refers to identifying adversarial input data for which the black box object detection algorithm will fail to perform accurate detection.

2. The method according to claim 1, further comprising collecting the initial input data from the sensor.

3. The method according to claim 2, wherein the collecting the initial input data includes collecting an image from a camera.

4. The method according to claim 3, further comprising obtaining the black box object detection algorithm output as a bounding box around a detected object in the image, and processing the black box object detection algorithm output to obtain the initial training data set.

5. The method according to claim 4, wherein the processing includes overlaying a grid on the image with the bounding box around the detected object and assigning a value to each element of the grid based on a presence or a percentage of the bounding box in the element of the grid.

6. The method according to claim 1, further comprising selecting an architecture for the substitute model.

7. The method according to claim 1, further comprising modifying the initial input data to obtain second input data.

8. The method according to claim 7, further comprising obtaining a second training data set based on the black box object detection algorithm performing the object detection on the second input data.

9. The method according to claim 8, wherein the training the substitute model includes ensuring that the output of the substitute model replicates the second training data set based on using the second input data.

10. The method according to claim 9, further comprising repeating processes of modifying the initial input data to obtain new input data, obtaining new training data based on the black box object detection algorithm performing the object detection on the new input data, and training the substitute model using the new training data.

11. A system to generate an adversarial attack on a black box object detection algorithm, the system comprising:
a sensor configured to provide initial input data;
a processor configured to obtain an initial training data set from the black box object detection algorithm, wherein the black box object detection algorithm performs object detection on initial input data to provide black box object detection algorithm output that makes up the initial training data set, to train a substitute model with the initial training data set such that output from the substitute model replicates the black box object detection algorithm output that provides the initial training data set, wherein details of operation of the black box object detection algorithm are unknown and details of operation of the substitute model are known, and to use the substitute model to perform the adversarial attack, wherein the adversarial attack refers to identifying adversarial input data for which the black box object detection algorithm will fail to perform accurate detection.

12. The system according to claim 11, wherein the sensor is a camera.

13. The system according to claim 12, wherein the initial input data includes an image from the camera.

14. The system according to claim 13, wherein the black box object detection algorithm output includes a bounding box around a detected object in the image, and the processor processes the black box object detection algorithm output to obtain the initial training data set.

15. The system according to claim 14, wherein the processor is further configured to process the black box object detection algorithm output by overlaying a grid on the image with the bounding box around the detected object and assigning a value to each element of the grid based on a presence or a percentage of the bounding box in the element of the grid.

16. The system according to claim 11, wherein the processor is further configured to modify the initial input data to obtain second input data.

17. The system according to claim 16, wherein the processor is further configured to obtain a second training data set based on the black box object detection algorithm performing the object detection on the second input data.

18. The system according to claim 17, wherein the processor is further configured to train the substitute model to ensure that the output of the substitute model replicates the second training data set based on using the second input data.

19. The system according to claim 18, wherein the processor is further configured to repeat modifying the initial input data to obtain new input data, obtaining new training data based on the black box object detection algorithm performing the object detection on the new input data, and training the substitute model using the new training data.

20. The system according to claim 11, wherein the sensor is in a vehicle.

* * * * *